(12) United States Patent
Pullman

(10) Patent No.: US 6,533,946 B2
(45) Date of Patent: Mar. 18, 2003

(54) APPARATUS AND METHOD FOR RECYCLING DRILLING SLURRY

(75) Inventor: Doug Pullman, Watford (CA)

(73) Assignee: Roger H. Woods Limited, Watford (CA)

(*) Notice: Subject to any disclaimer, the term of this patent is extended or adjusted under 35 U.S.C. 154(b) by 84 days.

(21) Appl. No.: 09/773,578

(22) Filed: Feb. 2, 2001

(65) Prior Publication Data

US 2002/0104806 A1 Aug. 8, 2002

(30) Foreign Application Priority Data

Oct. 4, 2000 (CA) .......................................... 2322304

(51) Int. Cl.⁷ ................................................ C02F 1/00
(52) U.S. Cl. ...................... 210/787; 210/744; 210/790; 210/805; 210/806; 210/121; 210/155; 210/195.1; 210/201; 210/258; 210/259; 210/319; 175/206
(58) Field of Search ................................ 210/744, 787, 210/790, 800, 805, 806, 121, 155, 195.1, 201, 258, 259, 295, 314, 319; 209/155; 175/206

(56) References Cited

U.S. PATENT DOCUMENTS

| | | | |
|---|---|---|---|
| 2,453,465 A | 11/1948 | Sloan | |
| 2,795,403 A | 6/1957 | Mead | |
| 2,919,898 A | 1/1960 | Marwil | |
| 2,941,783 A | 6/1960 | Stinson | |
| 3,233,874 A | 2/1966 | Betulius | |
| 3,713,499 A | * | 1/1973 | Arscott et al. |
| 4,184,771 A | 1/1980 | Day | |
| 4,210,166 A | 7/1980 | Munie | |
| 4,222,529 A | 9/1980 | Long | |
| 4,250,023 A | * | 2/1981 | Samis et al. |
| 4,459,207 A | 7/1984 | Young | |
| 4,474,254 A | 10/1984 | Etter et al. | |
| 4,634,535 A | 1/1987 | Lott | |
| 4,696,353 A | 9/1987 | Elmquist et al. | |
| 4,738,540 A | 4/1988 | Banks | |
| 4,809,791 A | 3/1989 | Hayatdavoudi | |
| 4,863,277 A | 9/1989 | Neal et al. | |
| 4,911,834 A | 3/1990 | Murphy | |
| 5,090,498 A | * | 2/1992 | Hamill |
| 5,303,786 A | 4/1994 | Prestridge et al. | |
| 5,570,749 A | 11/1996 | Reed | |
| 5,582,727 A | 12/1996 | Foster | |
| 5,779,355 A | 7/1998 | Pullman | |
| 5,853,583 A | 12/1998 | Shah | |
| 6,073,709 A | 6/2000 | Hensley | |

* cited by examiner

Primary Examiner—Betsey Morrison Hoey
(74) Attorney, Agent, or Firm—McFadden, Fincham

(57) ABSTRACT

An apparatus and method for recycling drilling mud contaminated with particulates, consists of channelling a stream of contaminated slurry onto a screen deck, with the partly cleansed liquid entering a mixing tank. Liquid within the tank is continually mixed. An exit conduit removes liquid from the tank on a continuous basis, where it is given an additional purification with a cyclonic separator. The heavier fraction is further screened, with the resulting purified liquid re-entering the tank. The lighter fraction exists the cyclonic separator, and a portion of the lighter liquid is withdrawn for use as a substantially cleansed liquid. Another portion of the lighter fraction is re-circulated back into the tank, thus providing multi passes through the system to provide enhanced purification. The cleansed liquid may be directed into a separate mixing apparatus, in which additional slurry-forming powder such as Bentonite is added for forming a new slurry.

15 Claims, 7 Drawing Sheets

APPARATUS AND METHOD FOR RECYCLING DRILLING SLURRY

FIELD OF THE INVENTION

This invention relates to earth drilling, such as for the installation of pipes, electrical conduits and the like. In particular, it relates to cleaning and recycling of used drilling slurry or mud, for recycling of liquids for re-use in the drilling process.

BACKGROUND OF THE INVENTION

Drilling muds and slurries such as Bentonite-based mud are used in various earth drilling operations such as drilling and back reaming of passages for the installation of pipes, electrical conduits and the like. During the drilling operation, slurry may be used for high pressure jetting (cutting), cooling down of instrumentation, forming a wall cake, and carrying waste material out of the hole. The returned mud is typically captured temporarily in a lined pit for disposal or cleaning. Due to environmental concerns relating to used mud and the costs associated with Bentonite, as well as potential difficulties in obtaining water on the job site, it is advantageous to process the returns for re-use, by cleaning the used slurry of larger particulates such as rock chips and sand and recycling the resulting liquids. Cleaning is also required in order to prevent wear and damage to high pressure pumps, mud motors and the like which may be caused by sand or grit in the re-used slurry.

Bentonite in its refined form is a dry, mined clay which is typically supplied in the form of a fine powder. Bentonite and other similar slurry-forming powders resist mixture with water to form a well-mixed slurry. Mixing apparatus such as that disclosed in U.S. Pat. No. 5,779,355 (Pullman) may be used to efficiently produce a well-mixed drilling slurry.

The supply of a clean (i.e. free of larger particles) and well-mixed supply of slurry is critical for drilling operations. It is also desirable to provide a reliable apparatus for reliably cleaning used slurry from recycled slurry.

Various systems have been used in the drilling industry, and as well have been proposed in a number of patents for recycling slurry liquid. Typically, these employ various combinations of shaker beds and screens to remove the larger debris, and cyclonic cleaners to remove finer particles. Most also use two or more storage tanks to hold dirty and cleansed fluid, as well as a mixing system to restore the cleansed slurry to a reusable condition, for example by adding new Bentonite or other slurry-forming powder. Typically Bentonite is lost in the cleaning process and thus it is necessary to supply additional Bentonite to restore the drilling mud.

Arrangements for recycling drilling slurries proposed previously include U.S. Pat. No. 5,853,583 (Shah) which uses three holding tanks to hold partially cleaned slurry, and a combination of filter screens and cyclones for removing particulates. After removal of solids, the resulting liquid is discharged from the apparatus.

In another arrangement, namely U.S. Pat. No. 2,941,783 (Stinson), recycled slurry is filtered through a screen and cyclone, and then passed through a storage tank. Cleaned fluid is removed from the tank, and redirected back into a drilling stand pipe or the like.

It is desirable to provide an efficient and compact unit that may be readily transported to a drilling site. In order to provide a simple and effective apparatus and process for recycling drilling mud, it is desirable that the arrangement employ only a single tank, and not require a separate and additional mixing system for restoration of the recovered and cleaned liquid. This permits a compact, transportable unit for recycling liquid from used drill slurry. Thus, it is desirable to provide an effective and efficient filtering means, as well as mixing means within the tank to enable the system a clean source of useable drilling mud.

SUMMARY OF THE INVENTION

In one aspect, the invention is an apparatus for cleaning and recycling slurry such as well-drilling slurry or mud, comprising:

an inlet for receiving a supply of drilling slurry contaminated with particulates;

first screening means for coarse filtering said slurry;

a slurry tank, with mixing means within said tank for mixing slurry filtered by the first screening means;

an outlet conduit for discharging slurry from said tank;

a cyclonic separator for separating said slurry received from the tank into a first stream containing relatively coarse particulates, and a second stream containing relatively fine particulates;

a second, fine, screening means for receiving said first stream and removing particulates therefrom, and discharging the resulting screened fluid into said tank;

a discharge conduit for receiving said second stream from said cyclonic separator, and directing said stream back into said tank, and into a discharge outlet for re-use for forming a usable-slurry;

pump means for cycling said slurry through said system on a continuous basis; and control means for controlling the operation of said system.

The cyclonic separator may comprise a bank of cyclonic separators operating in parallel.

Preferably, the second, fine, filter is positioned directly over the first filter means, which in turn is positioned over the tank. Thus, the filtered liquid flowing through the second screening means is discharged onto the first screening means and thereby assists in the screening process carried out by the first screening means. The first and second filters may be both mounted to a common frame for vibration by a single drive means. In another desirable aspect, the mixing means within the tank consists of a jet agitator, which directs one or more jets of liquid into the tank. The source of the liquid is drawn directly from the outlet conduit leading from the tank, thereby recycling a portion of the slurry through the tank.

In a further desirable aspect, the discharge conduit from the pump goes to a manifold for directing the partly cleansed liquid into several conduits. A first conduit leads to the cyclonic separator. A second conduit leads to a washing wand, which maybe manually operated, for cleaning of the screening means and other components of the apparatus. A third conduit may lead back to the inlet conduit, for increasing the liquid content of the incoming contaminated slurry, for improving the initial filtering operation.

The discharge conduit leading from the cyclonic separator may discharge the second, cleansed stream into an open trough having a first outlet for discharging liquid from the system and a second outlet leading back to the tank. The second outlet may be positioned above the first outlet to permit excess fluid to be directed back to the tank for recirculation.

Use of this apparatus provides a means for continually circulating the slurry through the mixing tank and various filtering and cleaning stages. Slurry removed from the system may thus have been recycled through the system several times.

In another aspect, drilling slurry is prepared by combining recycled liquid as processed in the above with Bentonite or other slurry-forming powder. In this aspect, a liquid stream exiting the cyclonic separator discharges recycled liquid into a shearing-type mixer as described in U.S. Pat. No. 5,779, 355. Cleansed liquid is drawn into the mixer and combined with Bentonite powder in the shear mixer apparatus, to provide a supply of fresh drilling mud prepared at least in part from recycled liquid.

In another aspect, the invention comprises a method for cleaning well-drilling slurry contaminated with particulates, and restoring the slurry to a substantially new condition. The method comprises the steps of:

providing a source of contaminated drilling slurry;

discharging said contaminated slurry onto a first screening means;

screening of said slurry with said screening means, into a mixing tank;

mixing said slurry within said tank;

discharging partly cleansed slurry from said tank via a conduit, into a cyclonic separator;

discharging from said separator a first stream of slurry containing relatively course particulates, and a second screen containing fine particulates;

depositing said first stream onto a second screening means and screening out particulates from said first stream, said screened liquid being deposited into said mixing tank;

selectively directing said second stream from the cyclonic separator, whereby the second stream is either discharged from the system for re-use, or returned to the mixing tank for circulation through the system.

In a further aspect, the second screening means is positioned directly over the first screening means, and the screened liquids flow onto the first screening means to assist in the screening operation carried out by the first screening means.

In a further aspect, a portion of the at least partly cleansed liquid is withdrawn downstream of the mixing tank and piped into the source of raw slurry to facilitate the initial screening step.

In a further aspect, partly cleansed liquid is withdrawn for use in cleaning components of the cleaning apparatus.

In a still further aspect of the method, partly cleansed liquid is withdrawn downstream of the mixing tank, and is redirected back into the mixing tank via a jet cleaner, to provide the mixing means within the tank.

BRIEF DESCRIPTION OF THE DRAWINGS

The FIG. 1 is a schematic diagram of a liquid recycle station according to the present invention.

DETAILED DESCRIPTION OF THE PREFERRED EMBODIMENTS

Figure 1:
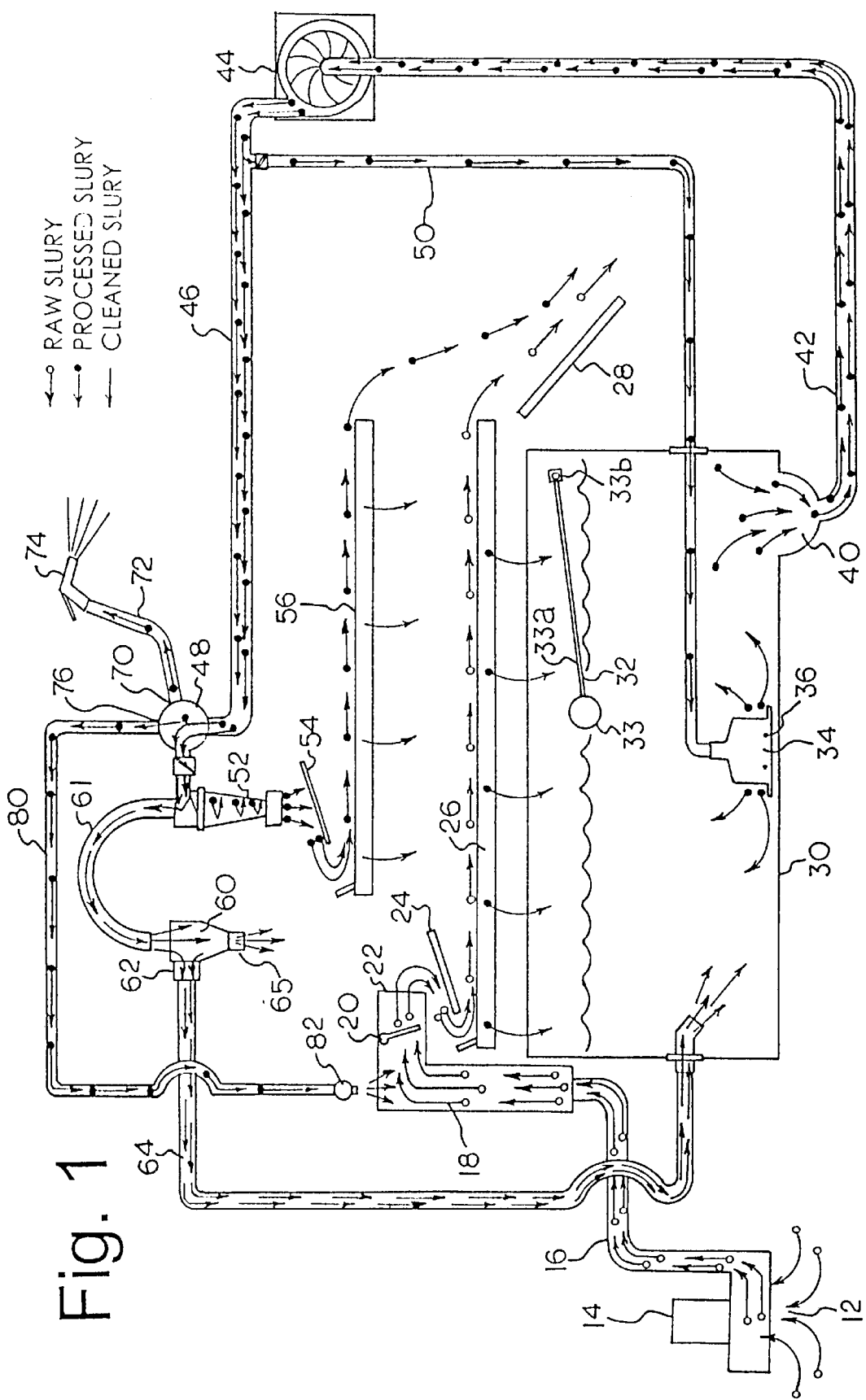
Figure 2:
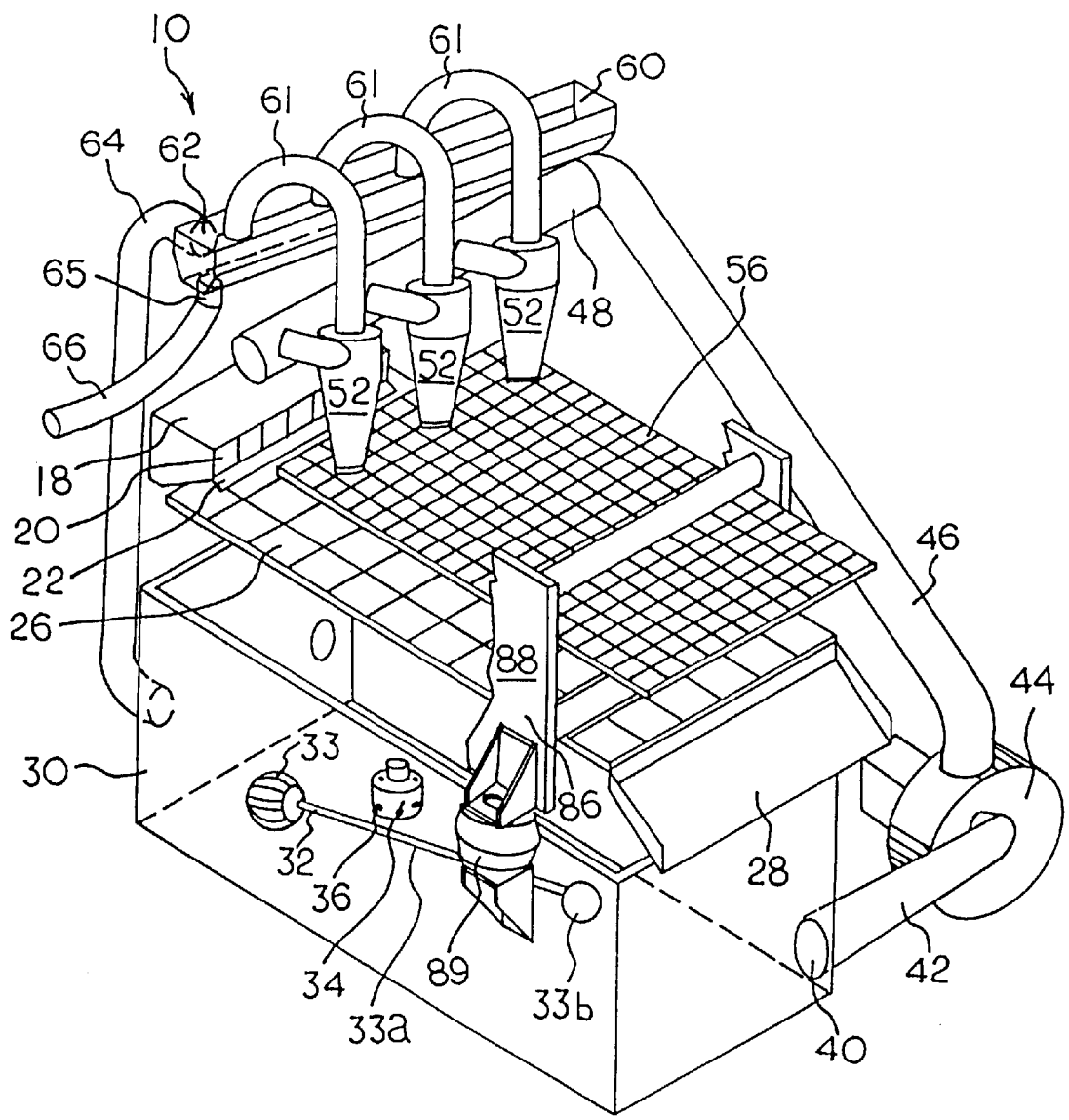
FIG. 2 is a perspective view, partly cut away, of the invention.
Figure 3:
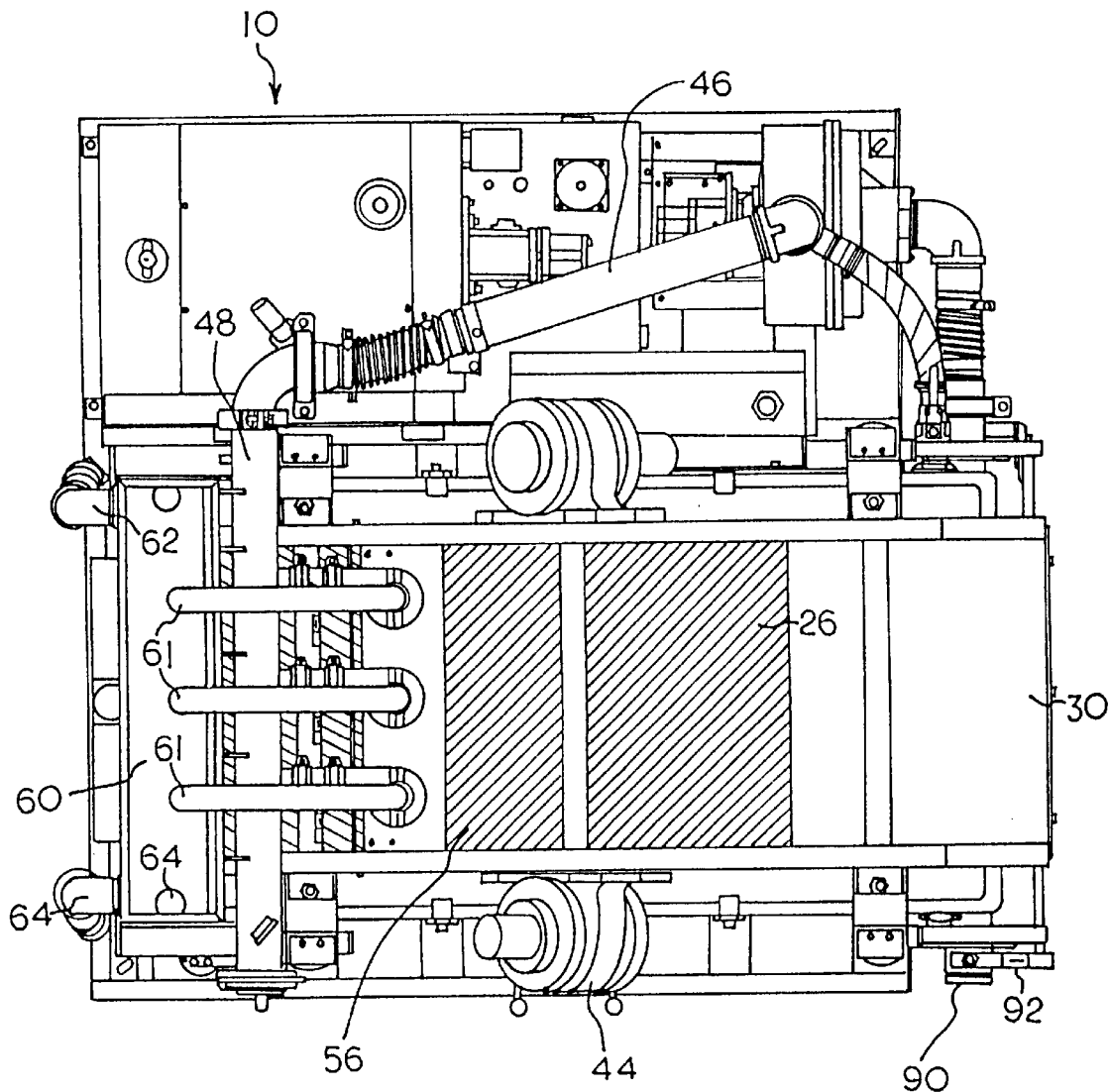
FIG. 3 is a top plan view of the invention.
Figure 4:
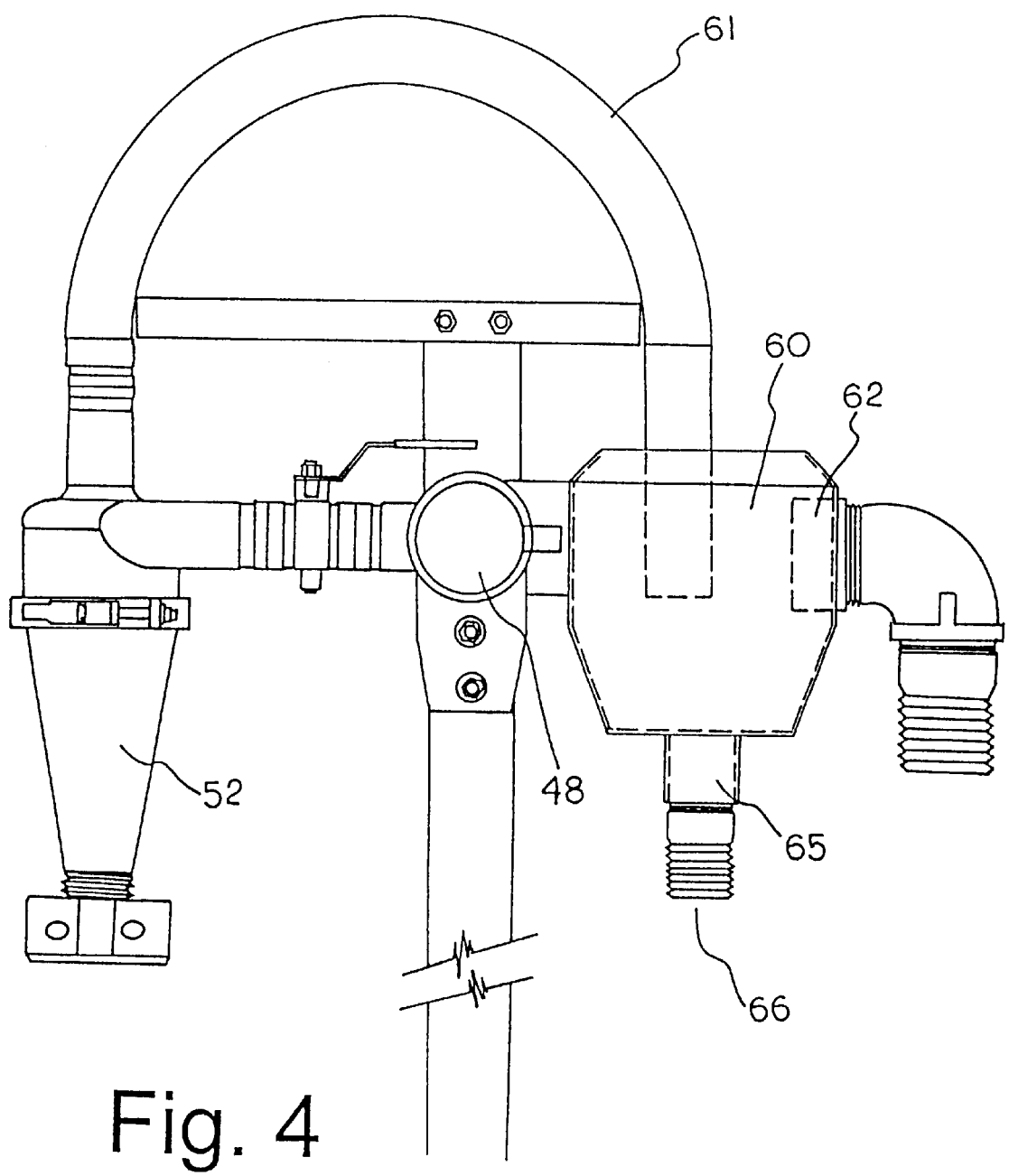
FIG. 4 is a side elevation of the cyclonic separator portion of the apparatus.
Figure 5:
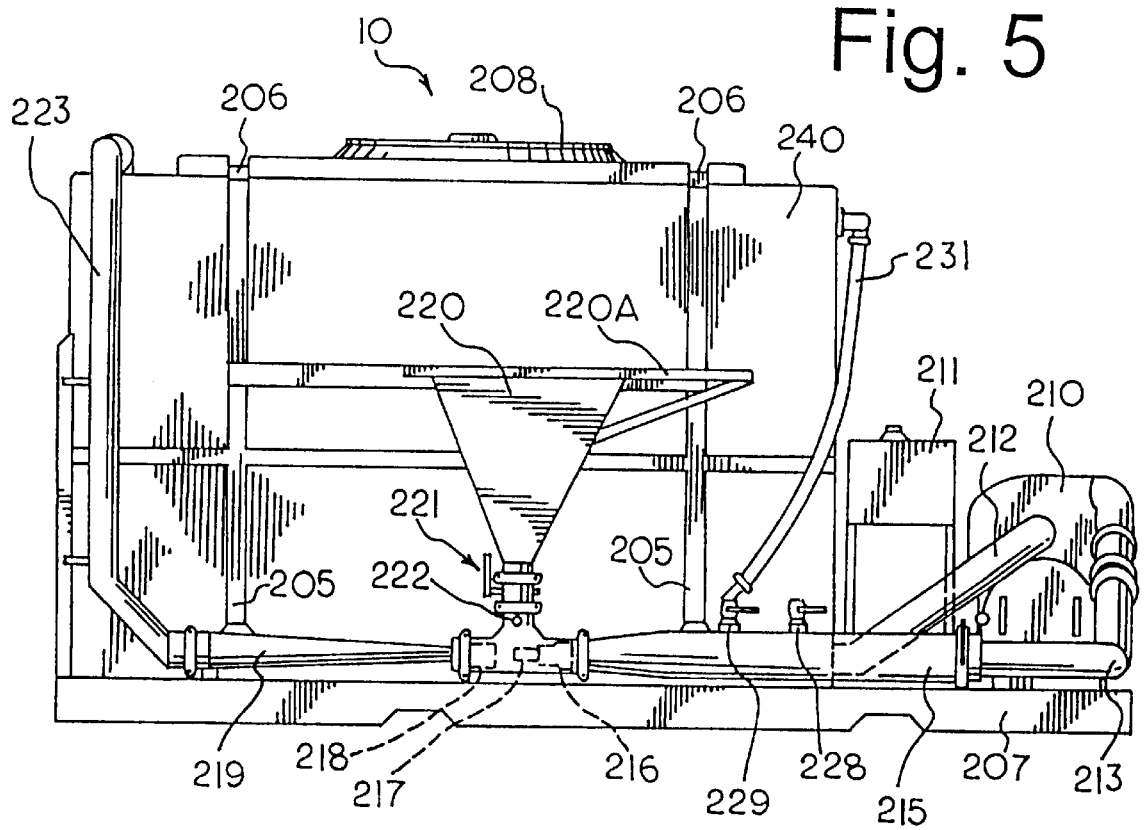
FIG. 5 is a side perspective view of a typical arrangement of the mixing station portion of the apparatus.
Figure 6:
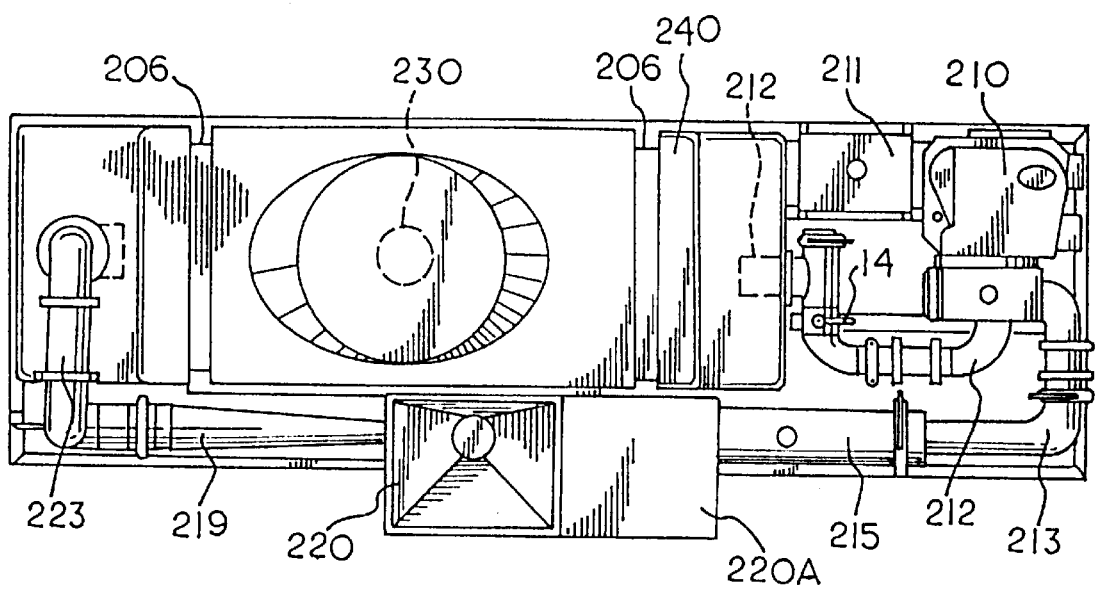
FIG. 6 is a top plan view of the apparatus of FIG. 5.

Referring to FIGS. 1–4, there is schematically illustrated a liquid recycle station 10 according to the present invention, which will be described herein by reference to the sequence in which contaminated slurry is processed by the apparatus. The apparatus 10 may be supported on a wheeled frame (not shown). Raw slurry comprising drilling waste or the like enters a first end of the apparatus. In general, increasingly fine particulates are removed until a liquid is discharged which is substantially free of sand, gravel and other coarse particulates.

Raw slurry 12 contaminated with particulate matter such as sand, rock chips or the like, enters the apparatus 10 via a submersible pump 14, which draws contaminated slurry into an inlet conduit 16. The slurry 12 then enters an elongate distribution chamber 18, which spans the width of the apparatus. The chamber 18 controls the flow of slurry via one or more flow regulating gates 20 mounted near the outlet of the chamber. The chamber 18 has an exit slot 22, which discharges the slurry 12 via gravity onto a vibrating weir plate 24 to dampen the fall of slurry. The slurry is then deposited onto a first vibrating shaker screen deck 26, which carries out an initial separation of the slurry 12 into a liquid portion and a solids portion consisting of coarse particles. The separated material is "walked" off the end of the deck by the vibratory action of the deck 26, to a spill chute 28, from where it is deposited onto a spoil pile. The screen deck is vibrated by a conventional motor and linkage means, which is described below.

The liquid portion of the slurry passes through the screen deck 26 and enters a mixing tank 30 which is positioned directly below the screen deck. The mixing tank consists of a large, open top rectangular tank. Within the tank, a float control 32 floats on the surface of the liquid, and controls the operation of the submersible pump 14 and thus prevents system overflow. The float control 32 comprises a hollow sphere 33 at the end of a rod 33(a). The rod 33(a) is pivotally joined to a support 33(b) and controls a switch (not shown). Slurry within the tank 30 is mixed by a gun 34 centrally located inside the tank. The gun 34 consists of multiple jets 36 which stir, blend and agitate the liquids and any sediments located inside the tank 30. The gun 34 receives a supply of pressurized liquid in a manner which will be described below.

Liquid within the tank 30 is discharged through a discharge outlet 40 which removes the mixed and partly cleansed slurry from the tank. The outlet leads into a conduit 42, which empties into a centrifugal pump 44 which draws the slurry through the conduit 42. The pump directs slurry into a further conduit 46, and thence into a pressurized controlled, sealed manifold 48 having multiple outlets. Prior to entry into the manifold 48, a portion of the slurry is directed into a secondary conduit 50, which leads to the gun 34 and delivers a supply of pressurized, partly cleansed fluid to the gun for mixing the slurry within the tank 30 as described above.

Liquid exits the manifold 48 into a bank of cyclonic separators 52, operating in parallel. The cyclones 52 each separate the partly cleansed liquid into a first stream containing larger particulates, and a second stream which is substantially cleansed of particulates. The first stream exits the bottom of the cyclones 52 and falls onto a vibrating weir plate 54 which dampens its fall. The liquid then is deposited onto a second vibrating shaker deck 56, which has finer screener characteristics than the first deck. The first deck 26 permits liquid to be removed from heavier materials, the latter being vibrated or walked off of the end of the deck, to the spill chute 28 and the common spoil pile. The second deck 56 is mounted directly over the first deck 26. Thus, screened liquid falls down onto the first deck 26 and aids in diluting the raw slurry as it passes over the first deck and also helps in reducing any build up in the screened particulates. The liquid then enters into the holding tank 30, for re-circulation through the system.

The second stream exiting the cyclone bank 52, which has been substantially cleansed of particles, is routed via conduit 61 to an open trough 60, where it collects. The trough 60 has two discharge outlets. A first outlet 62 is located near the top of the trough and exits into a conduit 64 which directs the liquid back into the holding tank 30 to be mixed and pumped back through the cyclone bank 52. This creates a continuous loop effect for cleaning the liquid through multiple cycles. This arrangement works well with a cyclonic-type cleaner, which works best with multiple passes to reduce particulate count. A second discharge outlet 65 from the trough 60 is located at or near the bottom of the trough 60, and is of a smaller size than the first discharge outlet 62. The second discharge outlet 65 discharges cleansed liquid from the system. The outlet 65 is connected to a discharge conduit 66. The relatively smaller size of the second discharge outlet 65, coupled with a gravity withdrawal means, or low vacuum, results in at least a substantial portion of the purified liquid exiting through the first discharge outlet 62 for re-circulation through the system. This results in most of the slurry passing through the system several times before exiting. Referring to the manifold 48, two further outlets, selectively withdraw partly cleansed liquid from the manifold. One such outlet 70 communicates with a flexible hose or wand 72, terminating in a hand-operable sprayer 74. The sprayer permits an operator to clean components of the system such as the shaker trays, by spraying the partly cleansed liquid onto built up material. Another outlet 76 leads to a conduit 80, which directs the liquid into a jetting bar 82 which communicates with the inlet chamber 18. The jetting bar 82 utilizes the cleaned fluid and pressure from within the manifold 48 to direct a stream of fluid into the incoming raw slurry. This aids in cleaning and diluting the flow and enhances the effect of the first vibrating shaker deck 26.

The upper and lower screen decks 26 and 56 are supported by a common frame 86. The frame 86 includes vertical supports 88, which attach to the frame 11 via spring mounts 89. A conventional motor arrangement 90 drives the frame 86 in a reciprocating vibratory motion. The motor arrangement 90 comprises two hydraulically-driven counterweights (vibrators), linked to the frame via a conventional linkage.

Discharged cleansed liquid from the apparatus 10 passes through the outlet 65 and, via exit conduit 66, into a slurry mixing apparatus 100 for formation of new slurry. The slurry mixing apparatus is illustrated at FIGS. 5 to 10. This restores the cleansed, recycled slurry to a reusable condition by the addition of new Bentonite powder. Slurry is drawn out of the trough by vacuum provided by the slurry mixer 100, and thus no additional pumping is required.

The mixer comprises a shear-type mixing apparatus.

Figure 9:
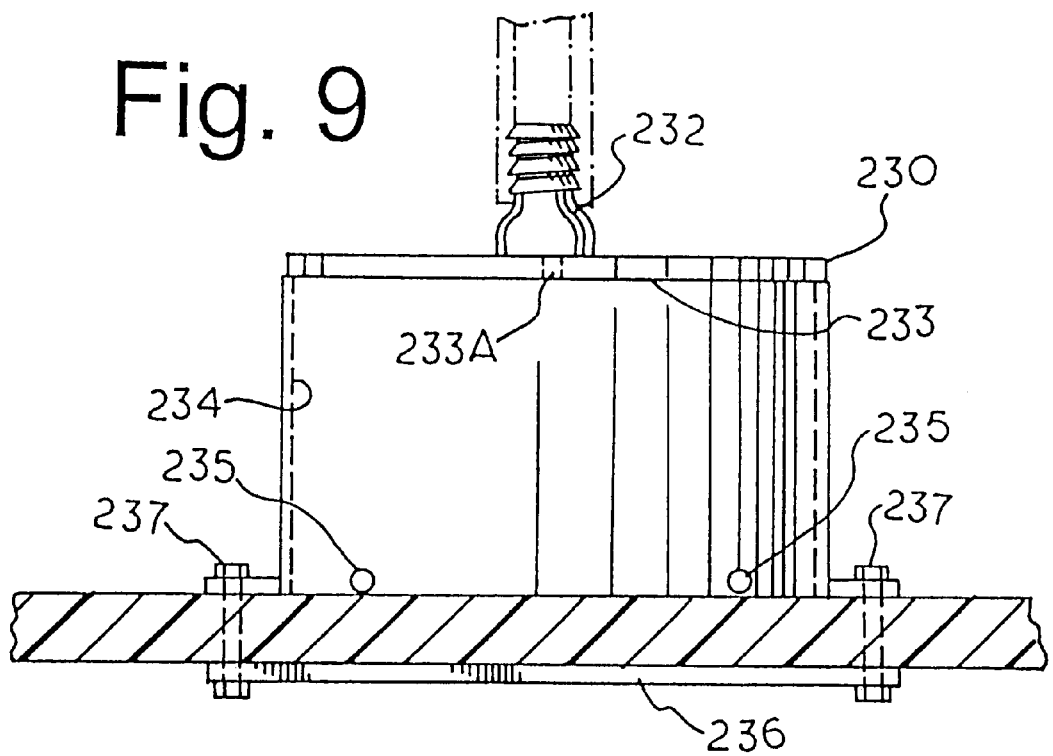
FIG. 9 is a vertical sectional view through one typical tank jet mixer.
Figure 10:
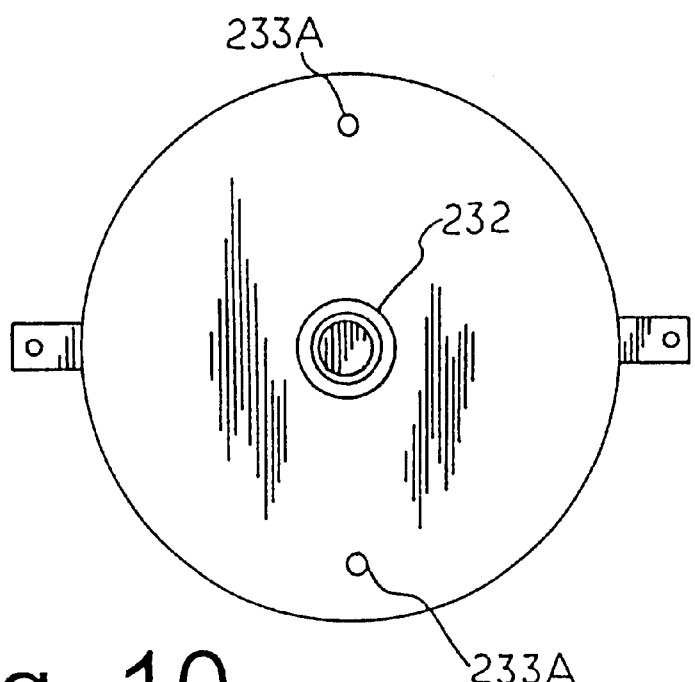
FIG. 10 is a top plan view of the tank jet mixer of FIG. 9 primarily showing the horizontal base and the location of the jet holes in the vertical walls just above the base.

FIG. 10 is a top plan view of the tank jet mixer of FIG. 9 primarily showing the horizontal base and the location of the jet holes in the vertical walls just above the base.

While the pump may be any design to handle solid-liquid mixtures, one type found very suitable is a trash pump which can cope with the irregular sized solids encountered on recycling used drilling muds. The capacity and output of the pump needs to be selected in conjunction with the components particularly the shear site components (as illustrated below). The pump intake is from the storage tank preferably near the jet mixer location.

The shear filter is chosen to remove solids that are above the maximum size tolerated by the rest of the system. The shear at the filter openings helps to break down aggregates on agglomerates formed of smaller sized pieces. One filter type found very suitable is a cylindrical sleeve or tube having openings in the periphery, with the flow entering axially at one end and exiting radially through the openings.

Preferably, a bleed of flow that has passed through the filter is fed to the tank jet mixer in which the jet openings are not smaller (and preferably larger) than the filter openings to avoid plugging. It has been found preferable to withdraw mixed and filtered product after the filter and before the jet nozzle.

The tank jet mixer is designed to direct jets across the bottom of the tank to minimize settling and dead spots. A smaller number of vertical (upward) jets may be used to encourage bottom to top mixing in the tank. Various jet mixers with nozzles or openings may be used with one preferred type described in detail below.

The main jet nozzle opening is sized to suit the pump capacity and back pressure (a preferred example is given below). An operative nozzle opening size range for drilling mud type mixtures may be from about 0.5 inch to about 0.9 inch diameter. The nozzle and associated funnel are fitted into a chamber able to maintain whatever vacuum is generated by the nozzle flow.

The vacuum chamber is fitted with at least one opening to introduce starting or make-up materials. It has been found preferable to have a valved hopper type inlet for solid materials, e.g. crude feed and a separate port for liquid materials, e.g. make-up liquid. The vacuum chamber enclosed the upstream end of the venturi, with the venturi being directionally coupled with the main jet nozzle.

The venturi intake funnels the jet nozzle stream to the venturi throat and from there the flow diverges through the venturi tube, and onward to the storage tank. An operative venturi throat diameter range may be from about 1.0 inch to about 1.6 inch I.D. for mud type mixtures depending on the capacity of the pump and the size of nozzle used.

The storage tank may be formed of plastic or metal, and sized to allow sufficient hold up of mixture to allow for batch or continuous operation as desired.

This multiple shear combination has several advantages. The combination allows for preparing mixtures from starting components, or from partial or used mixtures with make-up components added as required. The mixtures may be cycled out of and into the storage tank many times to increase uniformity and to allow for addition of various materials. It has been found to be desirable to have the final product outlet (between filter and nozzle) of smaller size than the circulating stream size, so that, as final product is off-loaded, more mixture is still being circulated, made up, filtered, etc. In fact, the combination may be operated in a continuous mode, or in a batch mode as desired.

Referring to FIGS. 5–10, pump 210 is driven by a gasoline engine (not shown) fed from gas tank 211, and connected to input conduit 212 from storage tank 240. In the example, the pump selected is a centrifugal one with a two-vane impeller and diffuser. The type of pump used can be any suitable type to obtain a sufficiently high vacuum in the mixing chamber. The output of the pump 210 is through conduit 213 connected to filter housing 215. The selection of the filter will be made to achieve a filter size such that it removes large particle material, permitting passage only of particles capable of being processed by the balances of the system. This is desirable to prevent blockage of any openings in the nozzles, etc. Downstream of the filter element (shown in FIG. 7 at 215A), the off-loading valve is shown at 228 in FIG. 7. Valve 229 and conduit 231 carry a bleed flow to feed internal tank jet mixer 230 (via internal conduit 231A shown in FIG. 4). From housing 215, the flow is directed to nozzle intake 216 and nozzle 217 within vacuum chamber 218. Chamber 218 has a top hopper 220 attached to hopper table 220A. Hopper shut-off valve is shown at 221 and auxiliary intake port at 222. The flow then proceeds through venturi 219 and conduits 223 and 224A into storage tank 240. Conduit 224A is inside tank 240 such that the return flow is released near the top of the tank and preferably above tank jet mixer 230. Storage tank 240 has cover 208 over access hatch (not shown) and anchor straps 205 and 206. The combination is mounted on skid frame 207. Couplers of various types may be used.

The intake port 222 may be used for the addition of various components such as fresh water for the system, reclaimed mud from a reclaimer, powdered material from a source of the same, various types of additives from primary sources. The addition of various components through inlet port 222 may be manual or through automated systems as desired, and of course, can take place while the system is operating.

Figure 7:
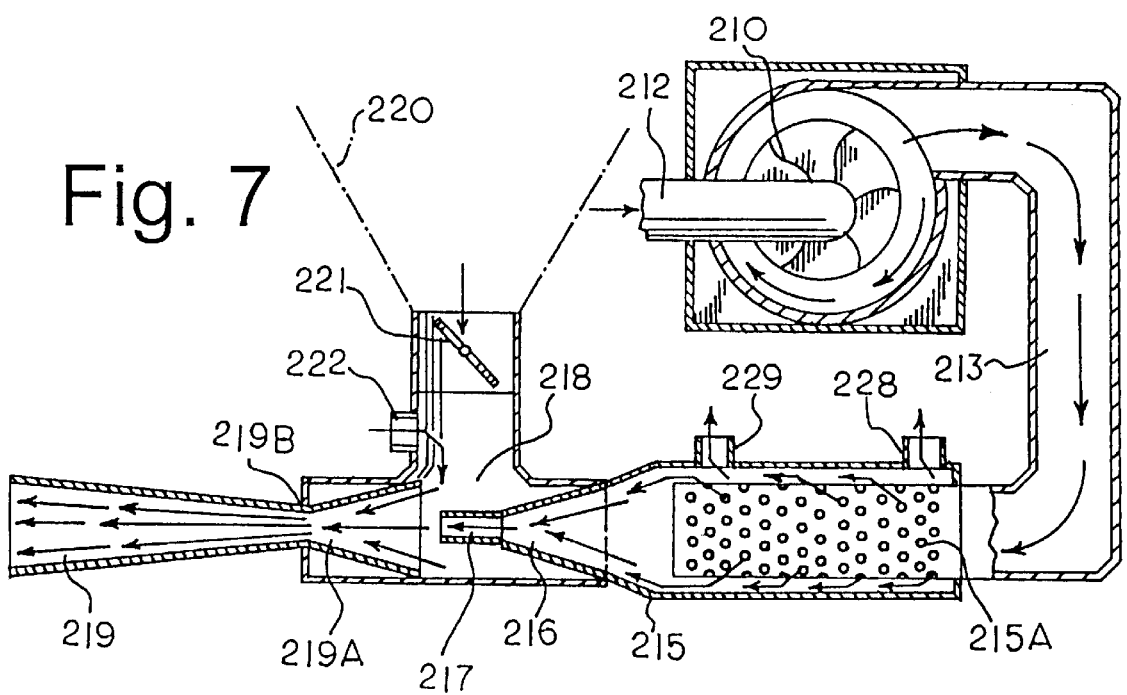
FIG. 7 is a schematic diagram of the fluid path through the primary mixing components.

In FIG. 7, arrows show the flow path in more detail. The inlet flow 212 from tank 240 enters pump 210 and exits through 213 to filter housing 215 containing filter tube 215A. Product outlet is shown at 228 which is a mixed product outlet and bleed to tank jet mixer is shown at 229. The flow then proceeds to nozzle intake funnel 216 and to nozzle 217. The hopper is indicated at 220 and the hopper shut-off valve at 221. The second intake port is shown at 222. The flow then proceeds through venturi intake 219A, throat 219B and venturi tube 219, then onward to storage tank 240.

The in-line filter may be mounted using quick-couplers for cleaning purposes; the filter housing may be such that it includes at least one access opening to permit manual flushing.

Figure 8:
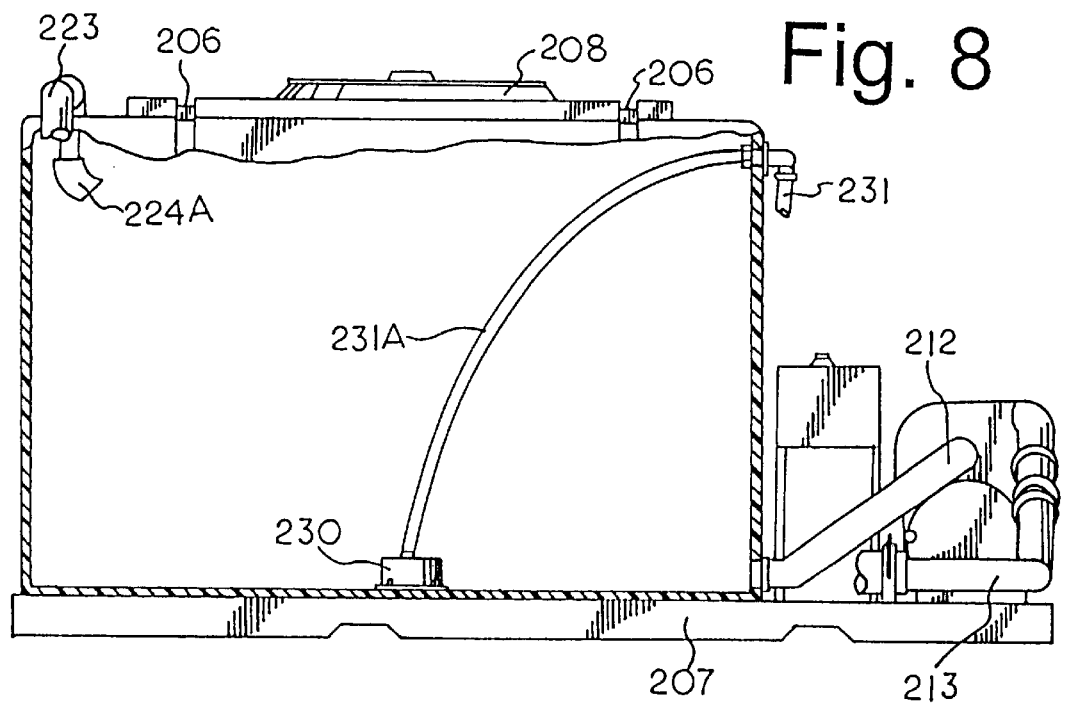
FIG. 8 is a vertical sectional view through the storage tank showing the location of, and feed conduit for, the tank jet mixer.

FIG. 8 shows storage tank 240 in vertical section, with the tank jet mixer at 230. The bleed line to the jet mixer is shown at 231A and the main flow return at 224A. The jet mixer 230 preferably is located centrally at or near the bottom of tank 240.

FIG. 9 is a vertical section through an example of jet mixer 230 showing inlet coupler 232, top plate 233, side wall 234, bottom plate 236, and mounting holes 237. Holes for horizontal jets (e.g. 5) are shown at 235 in wall 234. Holes (e.g. 2) for vertical jets in top plate 233 are shown at 233A.

FIG. 10 is a top plan view of top plate 233 showing inlet coupler 232, wall 234 and horizontal jet holes 233A. A mounting plate (not shown) may be used having holes aligned with holes 237, for mounting the jet mixer 230 to the bottom of tank 240.

Referring now to one specific example, the pump 210 is selected to have a flow capacity of 20,000 U.S. gallons per hour at a 75 foot head (water).

In the above described arrangement, various valves can be incorporated into the system at different points for closing different sections as desired for maintenance or other purposes.

The apparatus and method of the present invention are particularly useful in drilling operations where clays such as bentonite, which are used in such operations, create site problems. With the apparatus and method of the present invention, site problems are reduced or eliminated by recovery as opposed to having the mud come to the surface at the drilling site and flood the work area. The method and apparatus of the present invention can be used in combination with existing drilling equipment and techniques, to thereby provide a more effective and environmentally acceptable solution to the problems facing this field. By recovery of the bentonite, greater economy can be achieved and the cost of disposal of spent mud at a site is reduced. Recovery of the spent mud for further use provides further economic advantages.

In carrying out the method of the present invention using the arrangement described above, circulation of the recovered material through the system may be carried out for relatively brief times up to more extended times as required or desired. Thus, given the type of equipment described cycling times of 5 to 10 minutes, e.g. typically 7 minutes, may be used. In the method, using the outlet arrangement described above, as the fluid is off-loaded, more material is still being circulated and filtered/sheared. It should be noted that with typical drill mud or powders, the circulation, drilling, filtering and nozzle effect makes the resulting produce "cream" or fluff up, which is a desirable benefit since less raw product will be required. Still further, as the raw product is introduced into the hopper or shelf loading port, given the arrangement contemplated by this invention, will be broken down from the nozzle force and admixed with the material in the tank which is being re-circulated.

Operation of the slurry mixing system will now be described by reference to the figures.

Contaminated liquid enters the system via the submersible pump, and flows through the inlet conduit into the inlet chamber. Operation of the submersible pump is controlled by the mechanical float system which automatically shuts the pump down when the tank is full. This prevents overflow in circumstances when the shaker screens are incapable of handling the full capabilities of the pump, for example if the contaminated liquid is laden with clay. The pump may also be controlled by adjusting the pump speed from the operator's control panel.

Within the inlet chamber, the speed of the liquid is controlled via flow regulating gates near the outlet. Liquid is discharged from the inlet chamber, via the rear plate, onto the first shaking screen deck. This carries out an initial removal of the larger particles, which are then deposited onto a spoil pile. The initially-screened liquid then enters the mixing tank, where it is kept in continual motion by the jet gun. This prevents particulates from building up on the bottom of the tank. The partly cleansed liquid is removed from the tank, on a continuous basis, and pumped into the multi-outlet manifold. A portion of the liquid is pumped back into the tank, to operate the jet gun. Within the manifold, a portion of the liquid re-enters the inlet chamber, to assist in liquefying the incoming, contaminated slurry. A further portion maybe used for cleaning the system as described above. The third stream enters a cyclonic separator bank, which separates light and heavy components of the stream. The heavy component is deposited onto the second screened deck, for removal of fine particulates and re-circulation within the system. The light component is removed from the cyclone, and either re-circulates through the system or is withdrawn for use in preparing new slurry. Since cyclonic separators work best with several passes of fluid, it is preferably that the system be controlled to permit this.

After withdrawal of the cleansed liquid downstream of the cyclone, the liquid is then pumped into a multi-shear mixer of the type described above. Fresh Bentonite powder is added, and the resulting slurry is then used for the desired purpose. The slurry resulting from operation of the device will have substantially similar qualities as newly-prepared slurry. However, liquid entering into the slurry mixer via the cleaning apparatus described above, will have a significant quantity of Bentonite powder suspended therein, thus requiring a reduced quantity of new powder. As well, much or most of the water requirements of the slurry mixer will be satisfied by liquid entering the system from the cleaning apparatus.

Although the present invention has been described by reference to the preferred embodiment, it is understood that the full scope of the invention is characterized by the claims, which may permit the invention to be carried out otherwise than as specifically described.

What is claimed is:

1. An apparatus for cleaning slurry contaminated with particulates, comprising:
   an inlet for contaminated slurry;
   first screening means for receiving said slurry from said inlet and carrying out a coarse filtering of said slurry to remove coarse particulates and permit passage of a liquid fraction;
   a tank for receiving said liquid fraction from said first screening means, said tank including mixing means for maintaining the contents of said tank in suspension;
   an outlet from said tank communicating with a cyclonic separator for separating said liquid fraction into first and second streams, said first stream having relatively greater solids portion and said second stream having a relatively reduced solids portion;
   a second screening means for receiving said first steam from said cyclonic separator and removing fine particulates therefrom, for re-entry into said tank;
   an exit conduit from said cyclonic separator for said second stream, for directing a portion of said second stream back into said tank for recycle, and a further portion of said second stream for exiting said apparatus as a substantially purified liquid; and
   pumping means for circulating said liquid through said apparatus.

2. An apparatus as defined in claim 1, wherein said pumping means includes a inlet pump, said tank including a float therein for floating on said liquid within said tank, said float being connected via a rigid member to a control means wherein operation of said inlet pump is controlled by said float wherein said inlet pump is shut off when the level within said tank exceeds a pre-determined level.

3. An apparatus as defined in claim 1, wherein second screening means is positioned directly over said first screening means, for depositing cleansed liquid onto said first screening means.

4. An apparatus as defined in claim 1, wherein said mixing means comprises a jet agitator for directing a pressurized source of liquid into said tank, said pressurized source being drawn from the outlet conduit of said tank, and wherein said pumping means includes a pump within said outlet conduit for drawing liquid out of said tank and directing a portion of said withdrawn liquid back into said tank as a pressurized stream through said jet gun.

5. An apparatus as defined in claim 1, further comprising a manifold downstream of said tank, said manifold having a first outlet for directing a portion of said liquid into said cyclonic separator and a second portion into a conduit leading into said intake chamber.

6. An apparatus as defined in claim 1, wherein said second stream from said cyclonic separator enters a discharge vessel, said discharge vessel having a first, upper outlet linked to said tank and a second, lower outlet for discharge of purified liquid.

7. An apparatus as defined in claim 1, further comprising a slurry-mixing apparatus for receiving purified liquid from said second stream and having means for mixing said liquid with additional slurry-forming powder, to form a slurry having the characteristics of substantially new slurry for discharge into a slurry-using operation.

8. An apparatus as defined in claim 7, wherein said slurry mixing apparatus comprises a multi shear mixing apparatus comprising, in sequence:
   a pump suitable for liquid solid mixtures;
   a rigid shear filter;
   a jet nozzle;
   a vacuum chamber surrounding the jet nozzle and having at least one port for introducing starting or make up materials;
   a venturi tube coupled with the jet nozzle;
   a storage tank for the mixture;
   an internal jet mixer within the storage tank; and
   the above components of said shear mixing apparatus being interconnected and adapted to pump storage tank contents through the shear filter, then through the jet nozzle and chamber into the venturi tube, the nozzle creating a vacuum to enable introducing materials through the port into the chamber and hence into the venturi tube before entering the storage tank, with product mixture being off-loaded between the shear filter and the jet nozzle.

9. An apparatus as defined in claim 1, adapted for cleaning drilling slurry contaminated with particulates.

10. An method for cleansing used slurry contaminated with particulates, comprising the steps of:
   providing a conduit for receiving contaminated slurry;
   discharging said contaminated slurry from said conduit in a controlled flow onto a first screening means for removal of coarse particles, and removing coarse particles from said slurry to form a partly-cleansed liquid stream;
   delivering the partly-cleansed liquid into a mixing tank, and agitating the liquid within said tank;
   discharging said liquid from said tank via a conduit, into a cyclonic separator, for separation of said partly cleansed liquid into a first, heavier fraction containing a greater portion of solids and a second, lighter fraction containing a lesser portion of solids;
   depositing said heavier fraction onto a second screening means having a finer screening means than said first screening means, and removing particles;

depositing liquid from said second screening means, into said tank; and removing said second fraction from said cyclonic separator, and directing at least a portion of said second fraction back into said mixing tank for recirculating said portion of said second fraction through said mixing tank, cyclonic separator and second screening means on a continuous basis for further purification while removing the balance of said second fraction as substantially purified liquid.

11. A method as described in claim 10, wherein liquid from said second screening means is deposited onto said first screening means.

12. A method as described in claim 10, wherein flow of said contaminated slurry is controlled by pumping means including an inlet pump controlled by the liquid level within said tank, whereby when said level exceeds a predetermined level, said pump is shut off.

13. A method as described in claim 10, wherein a portion of said partly cleansed liquid is diverted into said inlet vessel for dilution of incoming contaminated slurry.

14. A method as described in claim 10, wherein a portion of said partly cleansed liquid is diverted into a jet gun within said tank, said jet gun comprising said mixing means, said liquid diverted to said jet gun being pressurized by a pump means.

15. A method for recycling slurry contaminated by particulates, and regenerating slurry in substantially new condition, comprising the steps of:

directing a flow of contaminated slurry into an inlet for contaminated slurry;

cleaning said slurry by directing said slurry from said inlet and sequentially through an apparatus comprising:

first screening means for carrying out a coarse filtering of said slurry;

a tank for receiving liquid from said first screening means, said tank including mixing means for maintaining the contents of said tank in a suspension;

an outlet from said tank communicating with a cyclonic separator for separating said liquid into first and second streams containing respectively greater and lesser solids loads;

a second screening means for receiving said first steam from said cyclonic separator and removing fine particulates therefrom, for re-entry into said tank;

an exit conduit from said cyclonic separator for said second stream, for directing a portion of said second stream back into said tank for recycle through said apparatus, and a portion of said second stream for exiting said apparatus as a substantially purified liquid; and pumping means for circulating said slurry through said apparatus;

directing liquid removed from said apparatus, into a separate slurry-mixing apparatus;

adding an additional quantity of a slurry-forming powder;

adding additional water as required;

mixing said liquid and said slurry together until a slurry having the desired characteristics is achieved.

\* \* \* \* \*